United States Patent
Saeki et al.

(10) Patent No.: US 10,249,434 B2
(45) Date of Patent: Apr. 2, 2019

(54) CAPACITOR

(71) Applicant: Murata Manufacturing Co., Ltd., Nagaokakyo-shi, Kyoto-fu (JP)

(72) Inventors: Hiromasa Saeki, Nagaokakyo (JP); Mika Takada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/879,882

(22) Filed: Jan. 25, 2018

(65) Prior Publication Data

US 2018/0174751 A1 Jun. 21, 2018

Related U.S. Application Data

(63) Continuation of application No. PCT/JP2016/071987, filed on Jul. 27, 2016.

(30) Foreign Application Priority Data

Aug. 12, 2015 (JP) ................................. 2015-159566

(51) Int. Cl.
*H01G 4/06* (2006.01)
*H01G 4/33* (2006.01)
(Continued)

(52) U.S. Cl.
CPC ............. *H01G 4/06* (2013.01); *H01G 4/00* (2013.01); *H01G 4/005* (2013.01); *H01G 4/008* (2013.01);
(Continued)

(58) Field of Classification Search
CPC ............ H01G 4/06; H01G 4/005; H01G 4/12; H01G 4/38; H01G 4/228; H01G 9/07; H01G 9/9045; H01G 9/055
See application file for complete search history.

(56) References Cited

U.S. PATENT DOCUMENTS

| | | | |
|---|---|---|---|
| 7,745,281 B2 | 6/2010 | Prymak et al. | |
| 8,451,582 B2 | 5/2013 | Sneh et al. | |

(Continued)

FOREIGN PATENT DOCUMENTS

| | | |
|---|---|---|
| JP | 2008-507847 A | 3/2008 |
| JP | 2009-81429 A | 4/2009 |

(Continued)

OTHER PUBLICATIONS

Fiorentino et al., "Impact of the atomic layer deposition precursors diffusion on solid-state carbon nanotube based supercapacitors performances," Nanotechnology, vol. 26, 2015, pp. 1-11.

(Continued)

*Primary Examiner* — Nguyen T Ha
(74) *Attorney, Agent, or Firm* — Arent Fox LLP

(57) ABSTRACT

A capacitor that includes a conductive porous substrate having a porous portion; a dielectric layer on the porous portion and containing an oxygen element and at least metal element; and an upper electrode on the dielectric layer. The porous portion has a path integral value of 1 μm/μm² to 16 μm/μm², and a porosity of 20% to 90%, and a ratio Z expressed by (1) below is 0.79 or more, $$Z = \frac{O_d/M_d}{O_r/M_r} \quad (1)$$

where $O_d$ and $M_d$ respectively represent signal intensities of the oxygen element and the metal element when the dielectric layer is analyzed by energy dispersive X-ray spectroscopy (EDS), and where $O_r$ and $M_r$ respectively represent signal intensities of the oxygen element and the metal element when a reference material having stoichiometric composition of the oxygen element and the at least one metal element constituting the dielectric layer is analyzed by the EDS.

14 Claims, 8 Drawing Sheets

(51) Int. Cl.
*H01G 9/04* (2006.01)
*H01G 4/00* (2006.01)
*H01G 4/008* (2006.01)
*H01G 4/12* (2006.01)
*H01G 4/005* (2006.01)

(52) U.S. Cl.
CPC ............... *H01G 4/12* (2013.01); *H01G 4/33* (2013.01); *H01G 9/04* (2013.01)

(56) References Cited

U.S. PATENT DOCUMENTS

| | | | |
|---|---|---|---|
| 9,512,527 B2 | 12/2016 | Matsunaga et al. | |
| 2004/0168929 A1* | 9/2004 | Katsir | H01G 9/0032 205/324 |
| 2007/0183120 A1* | 8/2007 | Fujimoto | H01G 9/0032 361/528 |
| 2008/0094775 A1 | 4/2008 | Sneh et al. | |
| 2008/0216296 A1 | 9/2008 | Prymak et al. | |
| 2010/0123993 A1 | 5/2010 | Laor | |
| 2010/0221606 A1* | 9/2010 | Nalamasu | C25D 11/32 429/209 |
| 2011/0310526 A1 | 12/2011 | Sneh et al. | |
| 2013/0120901 A1* | 5/2013 | Masuda | H01G 4/005 361/303 |
| 2013/0216849 A1 | 8/2013 | Matsunaga et al. | |
| 2013/0314845 A1* | 11/2013 | Chacko | H01G 9/04 361/502 |
| 2015/0114696 A1* | 4/2015 | Hong | H05K 1/182 174/255 |

FOREIGN PATENT DOCUMENTS

| | | |
|---|---|---|
| JP | 2010-520647 A | 6/2010 |
| JP | 2012-43960 A | 3/2012 |
| JP | 2012-144790 A | 8/2012 |
| JP | 2012-517717 A | 8/2012 |
| JP | 2013-159853 A | 8/2013 |

OTHER PUBLICATIONS

International Search Report issued in International Application No. PCT/JP2016/071987, dated Oct. 11, 2016.

Written Opinion of the International Searching Authority issued in International Application No. PCT/JP2016/071987, dated Oct. 11, 2016.

\* cited by examiner ial value of 1 μm/μm² to 16 μm/μm², and a porosity of
CAPACITOR

CROSS REFERENCE TO RELATED APPLICATIONS

The present application is a continuation of International application No. PCT/JP2016/071987, filed Jul. 27, 2016, which claims priority to Japanese Patent Application No. 2015-159566, filed Aug. 12, 2015, the entire contents of each of which are incorporated herein by reference.

FIELD OF THE INVENTION

The present invention relates to a capacitor.

BACKGROUND OF THE INVENTION

In recent years, capacitors having higher capacitance have been required as electronic devices are mounted with high density. As such a capacitor, Non-Patent Document 1 discloses a capacitor in which an $Al_2O_3$ layer is formed as a dielectric layer on a porous body composed of carbon nanotubes by an atomic layer deposition (ALD) method, and in which a TiN layer is formed as an upper electrode, for example.
Non-Patent Document 1: Nanotechnology 26 (2015) 064002

SUMMARY OF THE INVENTION

In Non-Patent Document 1, there are made attempts to form a capacitor by forming an $Al_2O_3$ layer as a dielectric using trimethylaluminum (TMA) gas and $H_2O$ gas by the ALD method. Withstand voltage of the capacitor thus obtained is much lower than withstand voltage expected from physical properties of the dielectric, and a reason therefor is tried to be explained based on a cylindrical model and thickness of an oxide film, however, phenomena have not been completely explained. Then, the present inventors have noticed the following points.

(1) When a metal-insulator-metal (MIM) capacitor structure is designed on a three-dimensional microstructure such as a porous body according to a simple cylindrical model, such a model has a large deviation from an actual shape of the porous body. Thus, ideal (or modeled) gas diffusion cannot be performed when the ALD method is used, so that high performance capacitors cannot be formed.

(2) To achieve performance of an MIM capacitor on a porous body, it is necessary to set a ratio of oxygen elements and metal elements of a dielectric film to specific conditions.

It is an object of the present invention to provide a capacitor including: a conductive porous substrate having a porous portion; a dielectric layer positioned on the porous portion; and an upper electrode positioned on the dielectric layer, the capacitor sufficiently maintaining functions of the dielectric layer.

As a result of intensive studies to solve the above problems, the inventors of the present invention find that the above-mentioned problems can be solved by satisfying predetermined conditions of each of the porous portion of the conductive porous substrate and the dielectric layer, and this leads to the invention.

According to a subject matter of the present invention, there is provided a capacitor including a conductive porous substrate having a porous portion; a dielectric layer on the porous portion and containing an oxygen element and at least one kind of metal element; and an upper electrode on the dielectric layer, wherein the porous portion has a path integral value of 1 μm/μm² to 16 μm/μm², and a porosity of 20% to 90%, and wherein a ratio Z expressed by Expression 1 below is 0.79 or more, $$Z = \frac{O_d/M_d}{O_r/M_r} \quad (1)$$

where $O_d$ and $M_d$ respectively represent signal intensities of the oxygen element and the metal element when the dielectric layer is analyzed by energy dispersive X-ray spectroscopy, and where $O_r$ and $M_r$ respectively represent signal intensities of the oxygen element and the metal element when a reference material having stoichiometric composition of the oxygen element and the at least one kind of metal element constituting the dielectric layer is analyzed by the energy dispersive X-ray spectroscopy.

According to the present invention, when the conductive porous substrate having the structure satisfying the predetermined conditions noted above is used in the capacitor, performance deterioration of the dielectric is suppressed. As a result, the function of the dielectric layer is sufficiently maintained, and a capacitor with high performance can be provided.

DETAILED DESCRIPTION OF THE INVENTION

Hereinafter, a capacitor of the present invention will be described in detail with reference to the drawings. However, a shape, a placement, and the like of the capacitor and each component of the present embodiment are not limited to those of illustrated examples.

Figure 1:
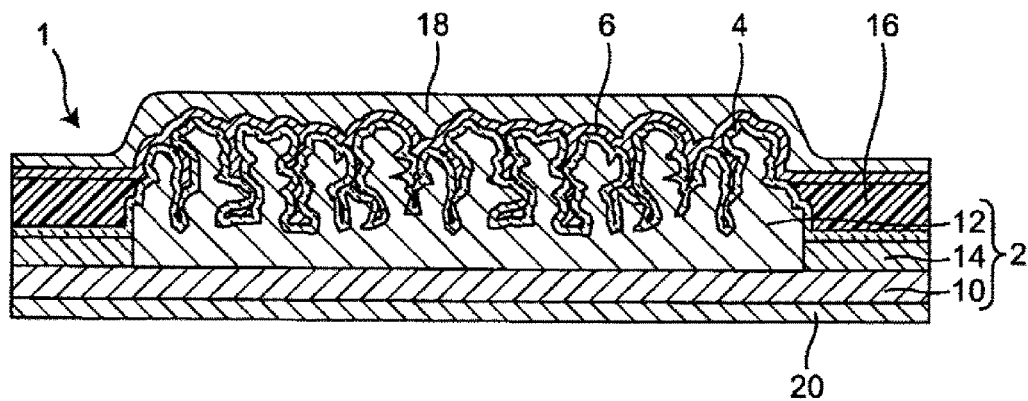
FIG. 1 is a schematic sectional view of a capacitor 1 according to an embodiment of the present invention.
Figure 2:
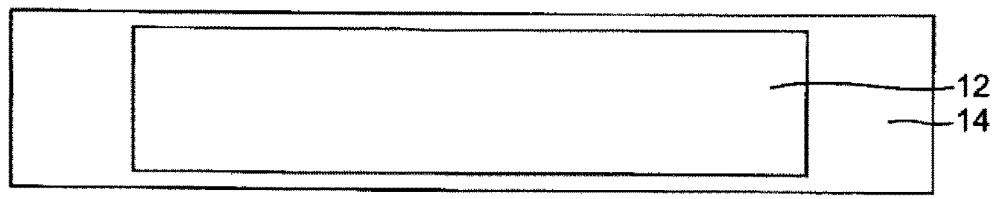
FIG. 2 is a schematic plan view of a conductive porous substrate of the capacitor 1 illustrated in FIG. 1.
Figure 3:
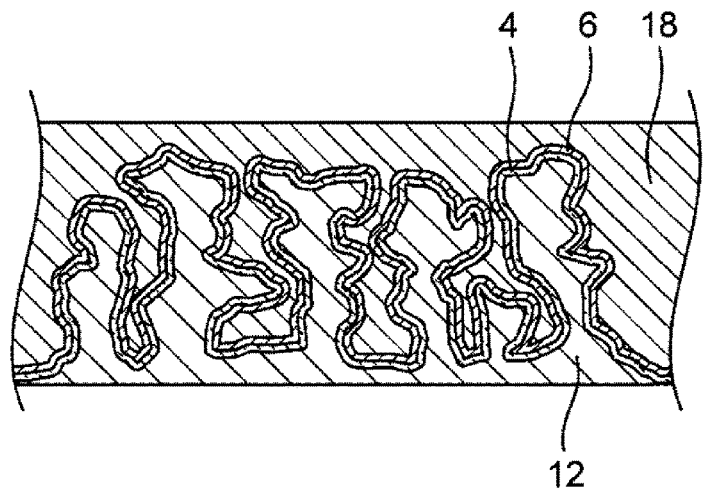
FIG. 3 is a schematic sectional view of a high porosity portion of the capacitor 1 illustrated in FIG. 1.
Figure 4:
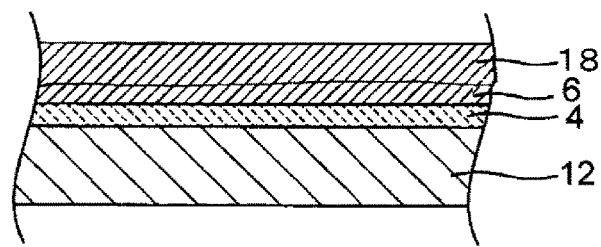
FIG. 4 schematically illustrates a layer structure of the high porosity portion of the capacitor 1 illustrated in FIG. 1.

A schematic sectional view of a capacitor 1 of the present embodiment is illustrated in FIG. 1 (however, many holes in a porous portion are not illustrated for simplicity), and a schematic plan view of a conductive porous substrate 2 is illustrated in FIG. 2. In addition, an enlarged view of a high porosity portion 12 of the conductive porous substrate 2 is illustrated in FIG. 3, and layer structures of the high porosity portion 12, a dielectric layer 4, an upper electrode 6, and a first external electrode 18 is schematically illustrated in FIG. 4.

As illustrated in FIGS. 1, 2, 3, and 4, the capacitor 1 of the present embodiment has a substantially rectangular parallelepiped shape, and schematically includes the conductive porous substrate 2, the dielectric layer 4 formed on the conductive porous substrate 2 (more specifically, at least the high porosity portion 12), and the upper electrode 6 formed on the dielectric layer 4. The conductive porous substrate 2 has the high porosity portion 12 having a relatively high porosity and a low porosity portion 14 having a relatively low porosity, on one main surface (first main surface) side. The high porosity portion 12 is positioned at the center portion of the first main surface of the conductive porous substrate 2, and the low porosity portion 14 is positioned around the high porosity portion 12. That is, the low porosity portion 14 surrounds the high porosity portion 12. The high porosity portion 12 has a porous structure, and thus corresponds to the porous portion described herein. In addition, the conductive porous substrate 2 has a support portion 10 on the other main surface (second main surface) side. That is, the high porosity portion 12 and the low porosity portion 14 constitute the first main surface of the conductive porous substrate 2, and the support portion 10 constitutes the second main surface of the conductive porous substrate 2. In FIG. 1, the first main surface is an upper surface of the conductive porous substrate 2, and the second main surface is a lower surface of the conductive porous substrate 2. At an end portion of the capacitor 1, an insulating portion 16 is provided between the dielectric layer 4 and the upper electrode 6. The capacitor 1 includes a first external electrode 18 on the upper electrode 6 and a second external electrode 20 on the main surface of the conductive porous substrate 2 on a support portion 10 side. In the capacitor 1 of the present embodiment, the first external electrode 18 and the upper electrode 6 are electrically connected, and the second external electrode 20 is electrically connected to the conductive porous substrate 2. The upper electrode 6 and the high porosity portion 12 of the conductive porous substrate 2 are disposed to face each other with the dielectric layer 4 interposed therebetween to constitute a capacitance forming portion. When the upper electrode 6 and the conductive porous substrate 2 are energized, electric charge can be accumulated in the dielectric layer 4.

The conductive porous substrate 2 has a porous portion, and its material and configuration are not limited as long as its surface is conductive. For example, the conductive porous substrate includes a porous metal substrate, a substrate formed with a conductive layer on a surface of a porous silica material, a porous carbon material, or a porous ceramic sintered body, and the like. In a preferred embodiment, the conductive porous substrate is a porous metal substrate.

Metal constituting the porous metal substrate includes metal such as aluminum, tantalum, nickel, copper, titanium, niobium, and iron, and an alloy such as stainless steel, duralumin, and the like, for example. In an aspect, the porous metal substrate can be an aluminum or nickel porous substrate, and particularly can be an aluminum porous substrate.

The conductive porous substrate 2 has the high porosity portion 12 and the low porosity portion 14 on one main surface (first main surface) side and the support portion 10 on the other main surface (second main surface) side.

In the present specification, the term "porosity" refers to a ratio of voids occupied in the conductive porous substrate. In addition, a path integral value is conceivable as another index representing a hole structure of such a conductive porous substrate. In the present specification, the term "path integral value" refers to a total perimeter of voids (holes) existing per unit area in any section of a conductive porous substrate. The porosity and the path integral value can be measured as follows. While voids (holes) of the porous portion can be finally filled with a dielectric layer, an upper electrode, and the like in a process of manufacturing a capacitor, the "porosity" and "path integral value" are calculated by considering a filled portion as a void without reference to a substance filled as described above.

The conductive porous substrate is processed by a focused ion beam (FIB) micro sampling method to prepare an analysis sample that is flaked so as to have a thickness of about 50 nm in a direction parallel to a main surface of the conductive porous substrate.

A damage layer formed on a surface of the sample during the FIB processing is removed by Ar ion milling. A predetermined region (3 μm by 3 μm) of the thin piece sample is photographed with a scanning transmission electron microscope (STEM).

Porosity

Image analysis of a photographed image is performed to determine an area where a substance (e.g., metal) constituting a conductive porous substrate exists. Then, a porosity can be calculated from the following equality.

Porosity (%)=((measurement area−area where a substance constituting a conductive porous substrate exists)/measurement area)×100

This measurement is performed at three arbitrary regions, and an average value of the three calculated values is indicated as the porosity (%).

Path Integral Value

Image analysis of a photographed image is performed to measure a total distance of interfaces between respective substances (e.g., metal) constituting a conductive porous substrate and respective voids (holes). A path integral value can be calculated as a value obtained by dividing the total value of the obtained distances by an area of the entire measured region. This measurement is performed at three arbitrary regions, and an average value of the three calculated values is indicated as the path integral value ($\mu m/\mu m^2$).

In the present specification, the term "high porosity portion" means a portion having a higher porosity than the support portion and the low porosity portion of the conductive porous substrate, and corresponds to the porous portion of the present invention.

The high porosity portion 12 has a porous structure. The high porosity portion 12 having a porous structure increases a specific surface area of the conductive porous substrate to further increase capacitance of a capacitor.

The high porosity portion (porous portion) has a porosity within a range of 20% to 90%. From a viewpoint of increasing a specific surface area to further increase capacitance of a capacitor, the porosity of the high porosity portion can be 20% or more, preferably 30% or more, more preferably 40% or more, and still more preferably 45% or more. From a viewpoint of ensuring mechanical strength, the porosity can be 90% or less, and preferably 80% or less.

The high porosity portion (porous portion) has a path integral value within a range of 1 µm/µm$^2$ to 16 µm/µm$^2$. As the path integral value increases, it is understood that a hole structure is complicated, and it can be schematically understood that a path length from an entrance of a hole to an innermost portion thereof increases. From a viewpoint of increasing a specific surface area to further increase capacitance of a capacitor, the path integral value can be 1 µm/µm$^2$ or more, preferably 2 µm/µm$^2$ or more, and more preferably 4 µm/µm$^2$ or more. In addition, from a viewpoint of forming a dielectric layer of high quality, the path integral value can be 16 µm/µm$^2$ or less, preferably 15 µm/µm$^2$ or less, and more preferably 12 µm/µm$^2$ or less.

In the present invention, the hole structure of the high porosity portion (porous portion) is defined by a porosity and a path integral value. For example, when a path integral value (µm/µm$^2$) and a porosity (%) of the conductive porous substrate are indicated as x and y, respectively, and are plotted on a plane formed by an x-axis and a y-axis orthogonal to each other, (x, y) can be within a region surrounded by points A (2.0, 49), B (12.2, 49), C (12.2, 63), D (15.0, 63), E (15.0, 88), F (4.6, 88), G (3.8, 85), and H (3.8, 63).

While an enlargement ratio of area of the high porosity portion is not particularly limited, the high porosity portion has an enlargement ratio of area that is preferably 30 times or more and 10,000 times or less, more preferably 50 times or more and 5,000 times or less, and 200 times or more and 600 times or less, for example. Here, the enlargement ratio of area means a surface area per unit projected area. The surface area per unit projected area can be obtained from the amount of adsorption of nitrogen at the liquid nitrogen temperature using a BET specific surface area measuring apparatus.

In the present specification, the term "low porosity portion" means a portion having a porosity lower than that of the high porosity portion. Preferably, a porosity of the low porosity portion is lower than a porosity of the high porosity portion, and is equal to or higher than a porosity of the support portion.

The porosity of the low porosity portion is preferably 20% or less, and more preferably 10% or less. In addition, the low porosity portion may have a porosity of 0%. That is, the low porosity portion may or may not have a porous structure. As the low porosity portion decreases in porosity, a capacitor increases in mechanical strength.

The low porosity portion is not an indispensable component in the present invention, and may not be provided. For example, a low porosity portion 14 may not be provided in FIG. 1, and then the support portion 10 may be exposed upward.

In the present embodiment, while the conductive porous substrate includes a high porosity portion on its one main surface and a low porosity portion provided around the high porosity portion, the present invention is not limited to this structure. That is, the high porosity portion and the low porosity portion are not particularly limited in existing position, the number of provided positions, size, shape, ratio of the both portions, and the like. For example, one main surface of the conductive porous substrate may be composed of only a high porosity portion. Each of main surfaces of the conductive porous substrate may have a high porosity portion. Capacitance of a capacitor can be controlled by adjusting a ratio of the high porosity portion and the low porosity portion.

Thickness of the high porosity portion 12 is not particularly limited, and can be appropriately determined depending on an object. For example, the thickness may be 10 µm or more, preferably 30 µm or more, and preferably 1000 µm or less, more preferably 300 µm or less, and 50 µm or less, for example.

The support portion of the conductive porous substrate preferably has a smaller porosity to serve as a support. Specifically a porosity of 10% or less is preferable, and substantially no void is more preferable.

While thickness of the support portion 10 is not particularly limited, the thickness is preferably 10 µm or more, and can be, for example, 30 µm or more, 50 µm or more, or 100 µm or more, to increase mechanical strength of a capacitor. From a viewpoint of reducing height of a capacitor, the thickness is preferably 1000 µm or less, and can be 500 µm or less, or 100 µm or less, for example.

Thickness of the conductive porous substrate 2 is not particularly limited, and can be appropriately determined depending on an object. For example, the thickness may be 20 µm or more, preferably 30 µm or more, and for example, may be 1000 µm or less, preferably 100 µm or less, more preferably 70 µm or less, and still more preferably 50 µm or less.

A method for manufacturing the conductive porous substrate 2 is not particularly limited. For example, the conductive porous substrate 2 can be manufactured by processing a suitable material by a method for forming a porous structure, a method for squeezing (filling) a porous structure, a method for removing a porous structure portion, or a method using a combination of the methods above.

A material (substrate material) for manufacturing a conductive porous substrate can be a metallic material, more specifically, a porous metallic material (e.g., etched foil) or a metallic material with no porous structure (e.g., metal foil), or a material acquired by combining these materials, for example. A method of combination is not particularly limited, and includes a method for bonding materials by welding or with a conductive adhesive or the like.

The method for forming a porous structure is not particularly limited, and preferably includes an etching treatment, such as an alternating-current etching treatment. As described below, the conductive porous substrate of the present invention has a conductive material layer on the second main surface, so that a capacitor defect such as a short circuit can be prevented even when through holes are formed in the substrate by etching treatment. Thus, the conductive porous substrate used in the present invention can be manufactured by etching treatment using a thinner material.

The method for squeezing (filling) a porous structure is not particularly limited, and includes a method for melting a substrate material by laser irradiation or the like to squeeze a hole, and a method for squeezing a hole by being compressed by die processing or press working, for example. The laser is not limited, and includes a $CO_2$ laser, a YAG laser, an excimer laser, and an all-solid pulsed laser such as a femtosecond laser, a picosecond laser, and a nanosecond laser. The all-solid pulsed laser such as a femtosecond laser, a picosecond laser, and a nanosecond laser is preferable because it can more finely control a shape and a porosity.

The method for removing a porous structure portion is not particularly limited, and includes dicer processing and ablation processing.

In one of the methods, the conductive porous substrate 2 can be manufactured by preparing a porous metal material and squeezing (filling) holes in a portion corresponding to the support portion 10 and the low porosity portion 14 of the porous metal substrate.

The support portion 10 and the low porosity portion 14 do not need to be formed at the same time, and they may be separately formed. First, a portion corresponding to the support portion 10 of the conductive porous substrate may be processed to form the support portion 10, and then a portion corresponding to the low porosity portion 14 may be processed to form the low porosity portion 14, for example.

In another method, the conductive porous substrate 2 can be manufactured by processing a portion corresponding to a high porosity portion of a metal substrate (e.g., metal foil) with no porous structure to form a porous structure.

In the capacitor 1 of the present embodiment, the dielectric layer 4 is formed on the first main surface of the conductive porous substrate 2 (or on the high porosity portion 12 and the low porosity portion 14). However, the present invention is not limited to this embodiment, and the dielectric layer may be formed on at least a porous portion (high porosity portion) of the conductive porous substrate.

A material forming the dielectric layer 4 is insulating and contains an oxygen element and at least one kind of metal element.

The metal element constituting the dielectric layer is not particularly limited, and may be at least one kind selected from a group consisting of Al, Hf, Si, Zr, Ta, Ti, Sr, Pb, La, Ba and Nb, and is preferably at least one kind selected from a group consisting of Al, Hf, Si and Zr. The dielectric layer can be substantially composed of an oxide of such a metal element, and a trace amount of another element (e.g., a substance derived from a raw material for forming a dielectric layer, specifically, carbon, hydrogen, or the like) may be contained. The oxide of such a metal element includes $AlO_x$, $HfO_x$, $SiO_x$, $ZrO_x$, $TaO_x$, $TiO_x$, $AlHfO_x$, $HfSiO_x$, $ZrSiO_x$, $AlTiO_x$, $SiTiO_x$, $TiZrO_x$, $TiZrWO_x$, $SrTiO_x$, $PbTiO_x$, $BaTiO_x$, $BaSrTiO_x$, $BaCaTiO_x$, and $SiAlO_x$, and is preferably $AlO_x$, $HfO_x$, $SiO_x$, or $ZrO_x$. Each of the formulas described above simply expresses structure of material, and thus does not limit composition thereof. That is, x attached to O may be any value larger than 0, and an abundance ratio of each element including a metal element is arbitrary.

In an aspect, a material forming the dielectric layer 4 is $AlO_x$ (stoichiometric composition is $Al_2O_3$).

In another aspect, a material forming the dielectric layer 4 contains Hf or Zr. When the dielectric layer contains Hf or Zr, it is easy to more uniformly form an upper electrode layer formed thereon.

In yet another aspect, a material forming the dielectric layer 4 is $HfO_x$ (stoichiometric composition is $HfO_2$) or $ZrO_x$ (stoichiometric composition is $ZrO_2$).

In another aspect, when the dielectric layer 4 contains two or more metal elements, a material forming the dielectric layer 4 may be a mixed crystal (or complex oxide) of each metal oxide. For example, a material forming the dielectric layer 4 may be $AlHfO_x$ (stoichiometric composition is mixed composition of $Al_2O_3$ and $HfO_2$, and a mixing ratio can be determined according to an abundance ratio of Al:Hf), $HfSiO_x$ (stoichiometric composition is mixed composition of $HfO_2$ and $SiO_2$, and a mixing ratio can be determined according to an abundance ratio of Hf:Si), or the like.

In yet another aspect, the dielectric layer 4 can be a nanolaminate containing an $HfO_x$ (stoichiometric composition is $HfO_2$) layer or a $ZrO_x$ (stoichiometric composition is $ZrO_2$) layer. Here, the nanolaminate means a layer in which a plurality of layers having a thickness of 0.5 nm to 2.0 nm is laminated. A preferable nanolaminate can be a laminate in which an $HfO_x$ layer or a $ZrO_x$ layer, and another layer (preferably a $SiO_x$ (stoichiometric composition is $SiO_2$) layer) are alternately laminated. Preferably, the outermost layer (layer in contact with an upper electrode) of the nanolaminate can be a layer containing Hf or Zr, for example an $HfO_x$ layer or a $ZrO_x$ layer. When the nanolaminate layer is used as the dielectric layer, dielectric breakdown voltage can be increased.

In any of the aspects, in the dielectric layer 4 (each layer in the case of a nanolaminate), a material forming the layer may have uniform composition or composition distribution (e.g., a composition gradient is allowed).

The dielectric layer 4 satisfies a ratio Z of 0.79 or more expressed by Expression 1 below:

$$Z = \frac{O_d / M_d}{O_r / M_r} \qquad (1)$$

where $O_d$ and $M_d$ respectively represent signal intensities of the oxygen element and the metal element when the dielectric layer is analyzed by energy dispersive X-ray spectroscopy (EDS), and where $O_r$ and $M_r$ respectively represent signal intensities of the oxygen element and the metal element when a reference material having stoichiometric composition of the oxygen element and the at least one kind of metal element forming the dielectric layer is analyzed by the EDS.

The EDS analysis of the dielectric layer is carried out as follows. First, a conductive porous substrate on which a dielectric layer is formed is processed by a focused ion beam (FIB) micro sampling method to prepare an analysis sample that is flaked so as to have a thickness of about 80 nm in a direction parallel to a main surface of the conductive porous substrate. A damage layer formed on a surface of the sample during the FIB processing is removed by Ar ion milling. When a section of the dielectric layer is analyzed by the EDS analysis using the obtained thin piece sample, signal intensity of elements constituting the dielectric layer can be measured.

While material forming the dielectric layer may be in various states, such as a mixed crystal, a nanolaminate, and a composition distribution, the EDS analysis of the dielectric layer is performed so that average signal intensity of the entire dielectric layer can be obtained. More specifically, EDS surface analysis is performed on a rectangular region in which a length of one side in the section of the dielectric layer is 80% or more of a thickness of the dielectric layer, so that signal intensity reflecting average composition of the dielectric layer can be measured.

The reference material has stoichiometric composition of an oxygen element and at least one kind of metal element, constituting the dielectric layer, and can be determined depending on the metal element constituting the dielectric layer. In the present invention, the expression "constituting a dielectric layer" is used in a sense excluding elements that can be mixed in trace amounts as impurities. The above stoichiometric composition means composition of the most stable metal oxide at room temperature (e.g., 25° C.) among oxides of a certain metal. For example, when a metal element constituting the dielectric layer is Al, the reference material is $Al_2O_3$, when a metal element constituting the dielectric layer is Hf, the reference material is $HfO_2$, when a metal element constituting the dielectric layer is Si, the reference material is $SiO_2$, and when a metal element constituting the dielectric layer is Zr, the reference material is $ZrO_2$. When two or more metal elements constitute the dielectric layer, the reference material is a mixture having a mixed composition of a metal oxide having stoichiometric composition for each of metal elements, and a mixing ratio of the mixture can be determined in accordance with an abundance ratio of each of the metal elements.

The EDS analysis of the reference material is carried out by preparing an analysis sample of the reference material in the same manner as the analysis sample of the dielectric layer described above and measuring the analysis sample in the same way. When two or more metal elements constitute the dielectric layer, $M_d$ and $M_r$ are total values of signal intensities of these metal elements on the dielectric layer and the reference material, respectively, when the EDS analysis is performed thereon.

The ratio Z obtained according to Expression (1) above using values of the signal intensities of the oxygen element and the metal element, measured by the above EDS analysis, is 0.79 or more. An upper limit thereof is not particularly limited, and may be 1.2 or less, for example. When the Z is 0.79 or more, it is possible to form a high-quality dielectric layer with a small amount of impurities such as substances derived from raw materials for forming the dielectric layer, specifically carbon, hydrogen, or the like. As a result, a capacitor having a high dielectric breakdown voltage can be obtained.

Thickness of the dielectric layer is not particularly limited, and is preferably 5 nm or more and 100 nm or less, and more preferably is 10 nm or more and 50 nm or less, for example. When the thickness of the dielectric layer is set to 5 nm or more, insulating properties can be enhanced to reduce leakage current. When the thickness of the dielectric layer is set to 100 nm or less, larger capacitance can be obtained.

The dielectric layer is preferably formed by a gas phase method such as a vacuum deposition method, a chemical vapor deposition (CVD) method, a sputtering method, an atomic layer deposition (ALD) method, a pulsed laser deposition (PLD) method, or the like. The ALD method is more preferable because a more homogeneous and dense film can be formed even in a fine hole of a porous substrate.

In the capacitor 1 of the present embodiment, the insulating portion 16 is provided at the end portion of the dielectric layer 4. When the insulating portion 16 is provided, a short circuit between the upper electrode 6 disposed on the insulating portion 16 and the conductive porous substrate 2 can be prevented.

In the present embodiment, while the insulating portion 16 is provided over the whole of the low porosity portion 14, the insulating portion 16 is not limited to this. The insulating portion 16 may be provided only in a part of the low porosity portion 14, and may be provided to the high porosity portion beyond the low porosity portion.

In addition, while the insulating portion 16 is positioned between the dielectric layer 4 and the upper electrode 6 in the present embodiment, the insulating portion 16 is not limited to this. The insulating portion 16 may be positioned between the low porosity portion 14 and the dielectric layer 4, for example, as long as being positioned between the conductive porous substrate 2 and the upper electrode 6.

While material forming the insulating portion 16 is not particularly limited as long as being insulative, resin with heat resistance is preferable when an atomic layer deposition method is used later. As an insulating material forming the insulating portion 16, various kinds of glass material, ceramic material, polyimide resin, and fluorine resin, are preferable.

While thickness of the insulating portion 16 is not particularly limited, the thickness is preferably 1 μm or more from a viewpoint of more reliably preventing end-face discharge, and can be 5 μm or more, or 10 μm or more, for example. From a viewpoint of reducing height of a capacitor, the thickness is preferably 100 μm or less, and can be 50 or less, or 20 μm or less, for example.

The insulating portion 16 is not an indispensable element in a capacitor of the present invention, and may not be provided.

In the capacitor 1 of the present embodiment, the upper electrode 6 is formed on the dielectric layer 4 and the insulating portion 16.

Materials constituting the upper electrode 6 are Ru, Pt, W, Ni, Cu, Ti, TiN, and TaN. Ru, Pt, and Ni are preferable. Ru and Pt are less susceptible to oxidation, and consequently, even when exposed to air for a long period of time, their conductivity is unlikely to decrease.

Thickness of the upper electrode is not particularly limited, and is preferably 3 nm or more, and more preferably is 10 nm or more, for example. When the thickness of the upper electrode is 3 nm or more, resistance of the upper electrode itself can be reduced.

The method of forming the upper electrode is not particularly limited as long as it is capable of coating the dielectric layer, and includes an atomic layer deposition (ALD) method, a chemical vapor deposition (CVD) method, plating, bias sputtering, a Sol-Gel method, a method of filling with a conductive polymer, and the like.

In a preferable aspect, the upper electrode is formed by the ALD method. The ALD method is preferable because a uniform (e.g., homogeneous and dense) film can be formed even in a fine hole of a porous substrate. When an Ru layer is formed as the upper electrode by the ALD method, a raw material is not particularly limited, and a precursor for a ruthenium film, such as $Ru(EtCp)_2$ (bis (ethylcyclopentadienyl) ruthenium) and ToRuS (manufactured by Air Liquide), and oxygen can be used as the raw material. When a Pt layer is formed as the upper electrode by the ALD method, a raw material is not particularly limited, and a precursor for a platinum film, such as $MeCpPtMe_3$ ((trimethyl) methylcyclopentadienyl platinum), and oxygen can be used as the raw material. As described above, no material containing chlorine as well as no reducing material is required to form the Ru layer or the Pt layer, so that the Ru layer or the Pt layer can be formed without adversely affecting other layers.

When the upper electrode does not have sufficient conductivity as a capacitor electrode after being formed, an extended electrode layer composed of Al, Cu, Ni, and the like may be additionally formed on a surface of the upper electrode by sputtering, vapor deposition, plating, or the like.

In the present embodiment, the first external electrode 18 is formed on the upper electrode 6, and the second external electrode 20 is formed on the support portion 10.

While material constituting the first external electrode 18 and the second external electrode 20 are not particularly limited, a metal such as Au, Pb, Pd, Ag, Sn, Ni, and Cu, and alloys thereof, and a conductive polymer, are preferable, for example. A method for forming the first external electrode 18 and the second external electrode 20 is not particularly limited, and a CVD method, electrolytic plating, electroless plating, vapor deposition, sputtering, baking of a conductive paste, and the like can be used, for example, and the electrolytic plating, the electroless plating, the vapor deposition, the sputtering and the like are preferable.

While the first external electrode 18 and the second external electrode 20 are provided over the entire main surface of the capacitor, the present invention is not limited to this, and the first external electrode 18 and the second external electrode 20 can be provided only in a part of each surface of the capacitor in any shape and size. In addition, the first external electrode 18 and the second external electrode 20 are not indispensable elements and may not be provided. In this case, the upper electrode 6 also functions as a first external electrode and the conductive porous substrate 2 also functions as a second external electrode. That is, the upper electrode 6 and the conductive porous substrate 2 may function as a pair of electrodes. In this case, the upper electrode 6 may function as an anode and the conductive porous substrate 2 may function as a cathode. Alternatively, the upper electrode 6 may function as a cathode and the conductive porous substrate 2 may function as an anode.

In an aspect, the first external electrode 18 can be a plating layer formed on the upper electrode 6, typically a Cu layer. The upper electrode of the capacitor of the present invention is formed of Ru or Pt, and thus is plated well so that the first external electrode 18 is unlikely to be peeled.

In the present embodiment, thickness of an end portion (preferably a peripheral portion) of the capacitor can be equal to or less than thickness of a central portion thereof, and can be preferably equal thereto. In the end portion, many layers are laminated, and thickness is liable to change due to cutting, so that a variation in the thickness can be increased. Thus, reducing the thickness of the end portion enables influence on an external size (particularly thickness) of the capacitor to be reduced.

In the present embodiment, while the capacitor has a substantially rectangular parallelepiped shape, the present invention is not limited to this. The capacitor of the present invention can have any shape, and may have a planar shape of a circle, an ellipse, a rectangle with rounded corners, or the like, for example.

While the capacitor 1 of the present embodiment is described above, various modifications can be made to the capacitor of the present invention.

For example, an intermediate layer, such as a layer for increasing adhesion between layers and a buffer layer for preventing diffusion of components between the respective layers, may be provided between the respective layers. These intermediate layers each preferably have a thickness of 1 nm or more, more preferably of 3 nm or more. In addition, a protective layer may be provided on a side surface of the capacitor or the like.

In the above embodiment, while the conductive porous substrate 2, the dielectric layer 4, the insulating portion 16, and the upper electrode 6 are disposed in this order in the end portion of the capacitor, the present invention is not limited to this. For example, the order of installation is not particularly limited as long as the insulating portion 16 is positioned between the upper electrode 6 and the conductive porous substrate 2. For example, the conductive porous substrate 2, the insulating portion 16, the dielectric layer 4, and the upper electrode 6 may be installed in this order.

In addition, while the capacitor 1 of the above embodiment includes the upper electrode and the external electrode that are provided up to an edge of the capacitor, the present invention is not limited to this. In an aspect, the upper electrode (preferably the upper electrode and the first external electrode) is installed away from the edge of the capacitor. This installation enables end-face discharge to be prevented. That is, the upper electrode does not need to be formed so as to wholly cover the porous portion, and the upper electrode may be formed so as to cover only the high porosity portion.

EXAMPLES

Aluminum etching foil was prepared. Aluminum etching foil of each of Examples 1 to 19 and Comparative Examples 1 to 3, having a path integral value and a porosity shown in Table 1, was prepared by adjusting etching conditions. Each of the path integral values and the porosities was measured in accordance with the above-described procedure after the FIB processing is applied to a substantially central portion of the aluminum etching foil. SMI 3050 SE (manufactured by Seiko Instruments Inc.) was used for the FIB, PIPS model 691 (manufactured by Gatan, Inc.) was used for the Ar ion milling, and JEM-2200FS (manufactured by JEOL Ltd.) was used for the STEM.

TABLE 1

| Sample number | Path integral value ($\mu m/\mu m^2$) | Porosity (%) |
|---|---|---|
| Example 1 | 2.0 | 49 |
| Example 2 | 3.8 | 49 |
| Example 3 | 9.2 | 49 |
| Example 4 | 12.2 | 49 |
| Example 5 | 3.8 | 63 |
| Example 6 | 4.6 | 63 |
| Example 7 | 12.2 | 63 |
| Example 8 | 15.0 | 63 |
| Example 9 | 3.8 | 72 |
| Example 10 | 4.6 | 72 |
| Example 11 | 7.8 | 72 |
| Example 12 | 9.2 | 72 |
| Example 13 | 12.2 | 72 |
| Example 14 | 15.0 | 72 |
| Example 15 | 3.8 | 85 |
| Example 16 | 9.2 | 85 |
| Example 17 | 15.0 | 85 |
| Example 18 | 4.6 | 88 |
| Example 19 | 15.0 | 88 |
| Comparative Example 1 | 19.2 | 72 |
| Comparative Example 2 | 19.2 | 85 |
| Comparative Example 3 | 19.2 | 88 |

Figure 5A:
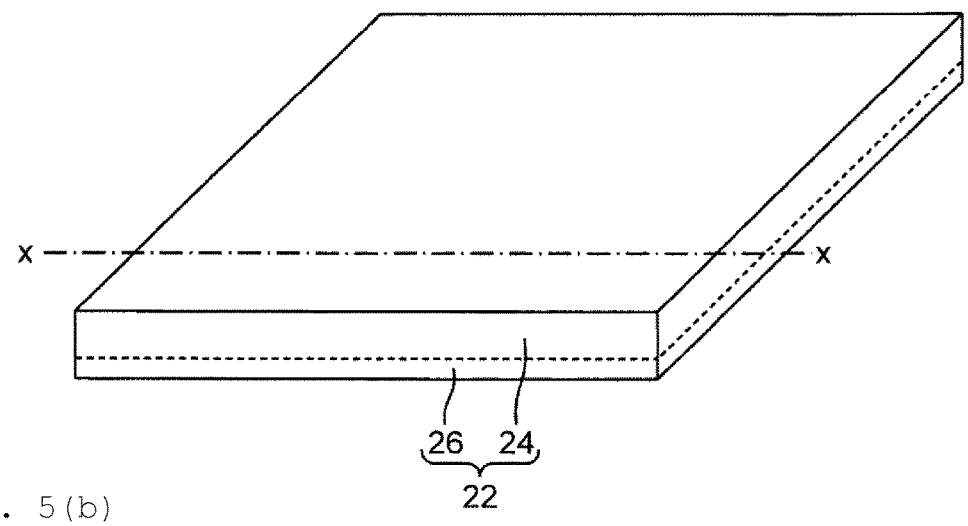
FIGS. 5(a) and 5(b) are manufacturing process diagrams of a capacitor of each of an example of the present invention and a comparative example.
Figure 5B:
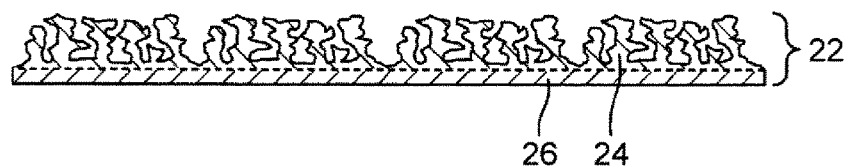
Figure 6A:
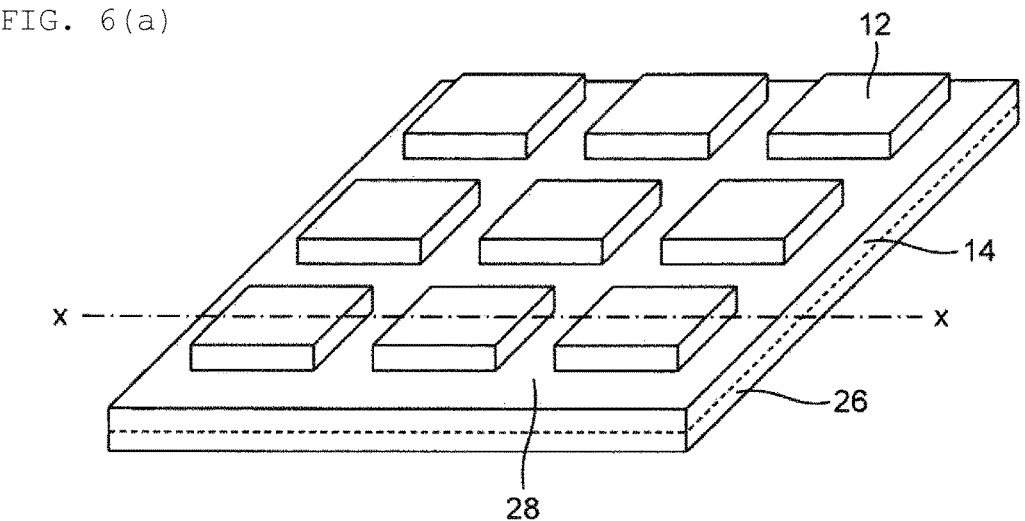
FIGS. 6(a) and 6(b) are manufacturing process diagrams of the capacitor of each of the example of the present invention and the comparative example.
Figure 6B:
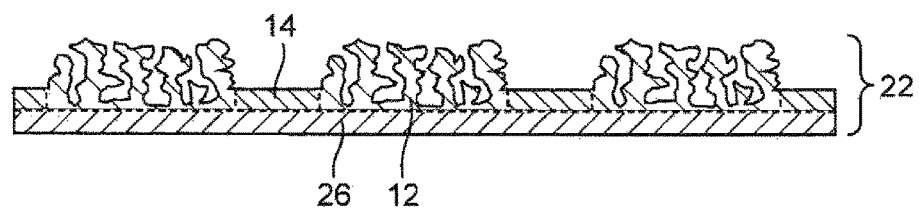

Holes in some regions of the conductive porous substrate (the conductive substrate 22 having the porous metal layer (porous portion) 24 on the support layer 26 in FIGS. 5(a) and 5(b)) prepared as described above were squeezed by a method such as pressing with a press to form grooves (low porosity portion) (groove portions 28 in FIGS. 6(a) and 6(b)).

Figure 7A:
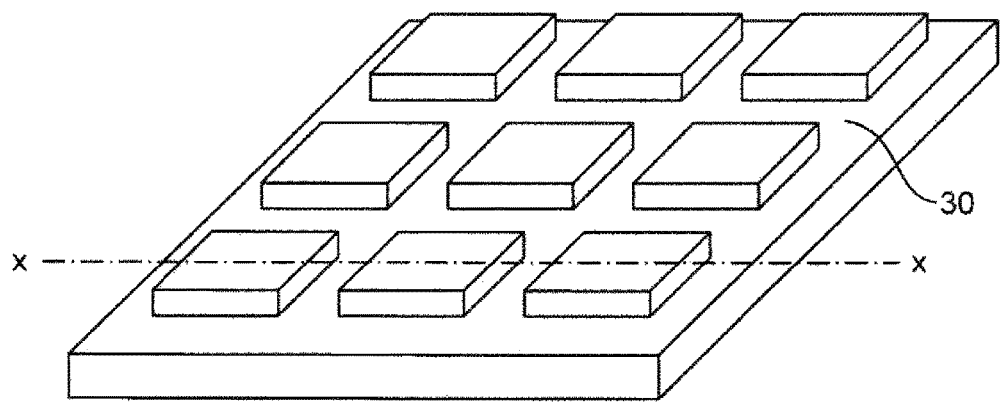
FIGS. 7(a) and 7(b) are manufacturing process diagram of the capacitor of each of the example of the present invention and the comparative example.
Figure 7B:
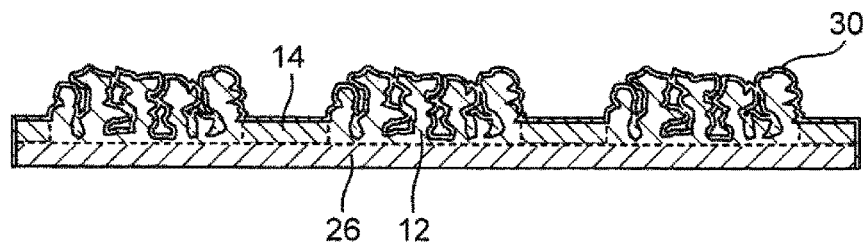

Subsequently, a dielectric layer was formed on the entire conductive porous substrate on which the grooves were formed by the ALD method. For the dielectric layer, each of three kinds of dielectric layer shown in Table 2 was formed with a thickness of about 15 nm on a surface of the holes of each substrate shown in Table 1 (a dielectric layer 30 in FIGS. 7(a) and 7(b)). Raw material gas, oxidizing agent, and substrate temperature, used in the ALD method are also shown in Table 2.

TABLE 2

| Dielectric layer | Raw material gas | Oxidant | Substrate temperature |
|---|---|---|---|
| $AlO_x$ | Trimethyl aluminum | Ozone | 250° C. |
| $SiO_x$ | Tris (dimethylamino) silane | Ozone | 250° C. |
| $HfO_x$ | Tetrakisdimethylamino hafnium | Ozone | 250° C. |

Figure 8A:
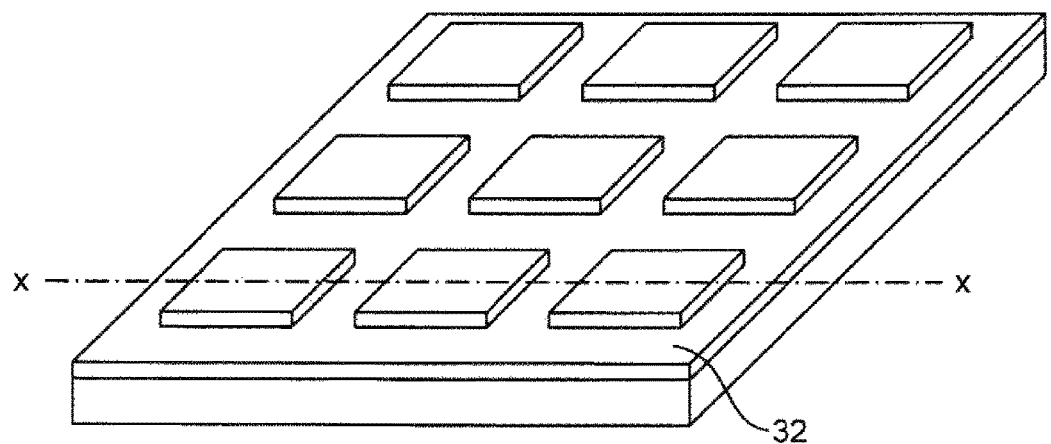
FIGS. 8(a) and 8(b) are manufacturing process diagram of the capacitor of each of the example of the present invention and the comparative example.
Figure 8B:
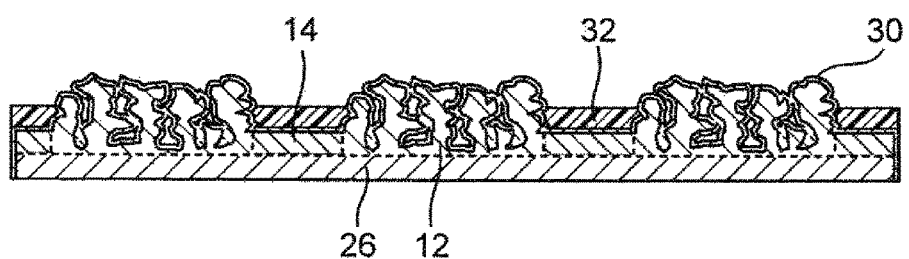

Subsequently, an insulating layer was formed by applying polyimide resin to the groove portions by a screen printing method (an insulating layer 32 in FIGS. 8(a) and 8(b)).

Figure 9A:
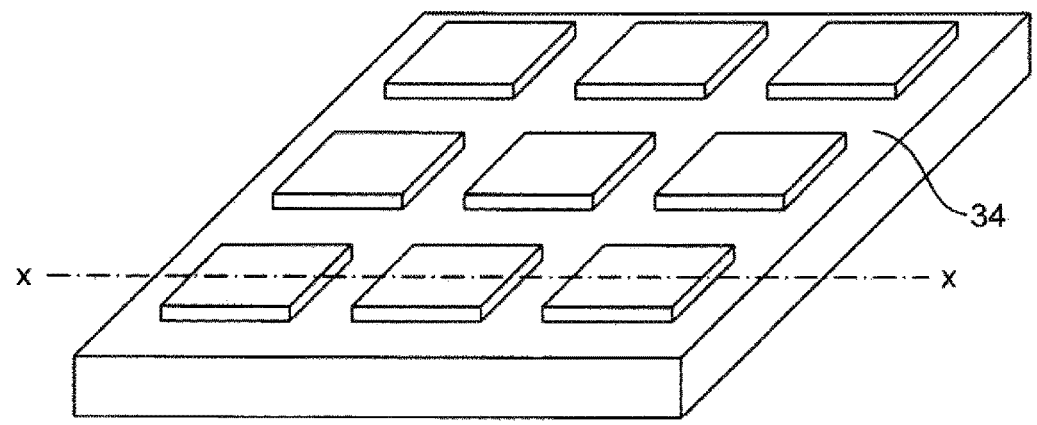
FIGS. 9(a) and 9(b) are manufacturing process diagram of the capacitor of each of the example of the present invention and the comparative example.
Figure 9B:
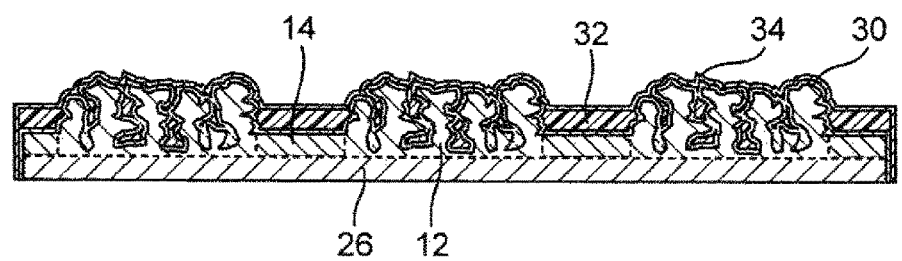

Subsequently, an upper electrode layer was formed on the dielectric layer by the ALD method. A process of alternately supplying tetrakisdimethylaminotitanium (TDMAT) gas and ammonia ($NH_3$) gas to the above-mentioned substrate was repeated for predetermined times, so that a TiN layer with a thickness of 20 nm was formed as the upper electrode layer on the dielectric layer (an upper electrode layer 34 in FIGS. 9(a) and 9(b)).

Figure 10A:
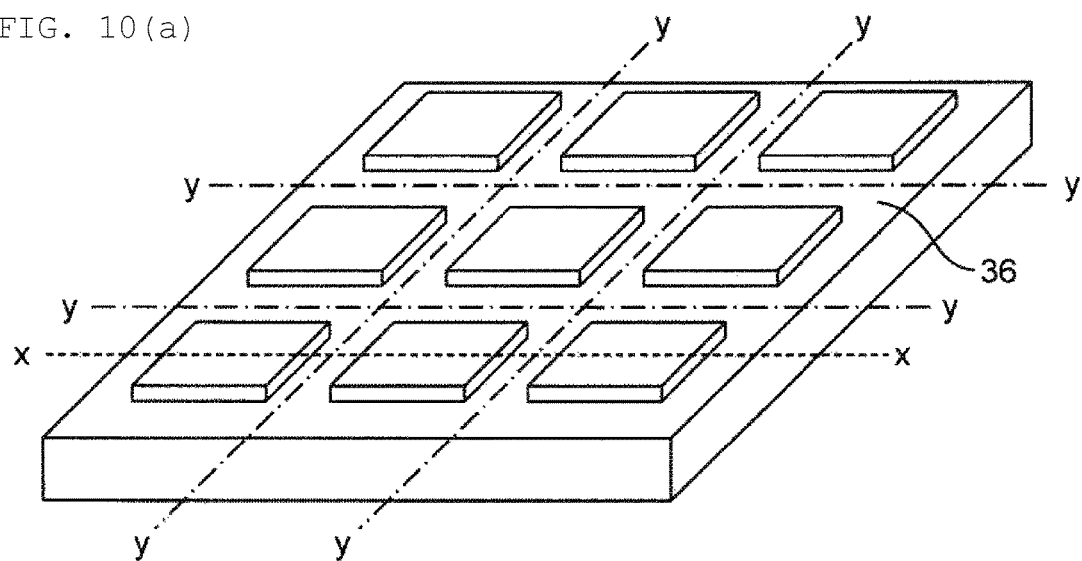
FIGS. 10(a) and 10(b) are manufacturing process diagram of the capacitor of each of the example of the present invention and the comparative example.
Figure 10B:
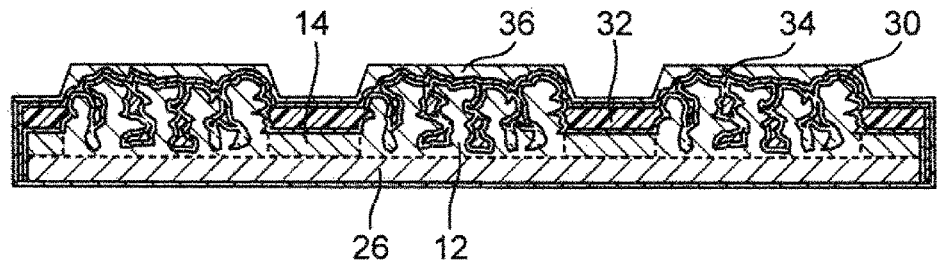

After that, the substrate was immersed in an electroless Cu plating bath to form an external electrode layer formed of a Cu plating layer, with a thickness of 10 μm (an external electrode layer 36 in FIGS. 10(a) and 10(b)).

Figure 11:
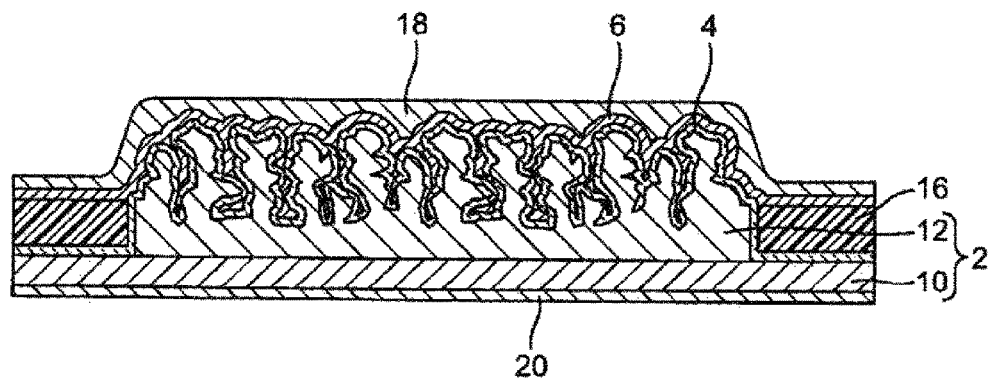
FIG. 11 is a schematic sectional view illustrating a manufacturing process diagram of the capacitor of each of the example of the present invention and the comparative example.

Subsequently, as illustrated in FIG. 10(a), a capacitor was obtained by laser cutting along line yy (FIG. 11).

(Evaluation of Dielectric Layer)

The capacitor obtained as described above was analyzed for its dielectric layers ($AlO_x$, $SiO_x$, $HfO_x$) and its each reference material ($Al_2O_3$, $SiO_2$, $HfO_2$) by the EDS analysis.

For an EDS analyzer, JED-2300T (manufactured by JEOL Ltd., detector name: Dry SD 60 GV, detector type: SDD) was used. The capacitor was evaluated under observation conditions where an acceleration voltage was 200 kV and an energy resolution at the time of measurement was 129 eV (Mn Kα). Each of samples had a thickness (in a direction parallel to a main surface of a substrate) of about 80 nm, and a diameter of an electronic probe at the time of measurement was 0.5 nm or less.

First, as the reference material, a dielectric layer substantially having each composition of $Al_2O_3$, $SiO_2$, and $HfO_2$ was deposited with a thickness of about 15 nm on a Si flat plate by the ALD method. Next, the dielectric layer as the reference material was analyzed by the EDS analysis at three points to measure an average value ($O_r/M_r$) of EDS signal intensity ratios of oxygen elements/metal elements. Al and Si were evaluated by K line, and Hf was evaluated by L line. $O_r/M_r$ (M=Al) in $AlO_2$ was 0.57, $O_r/M_r$ (M=Si) in $SiO_2$ was 1.0, and $O_r/M_r$ (M=Hf) in $HfO_2$ was 0.28.

Meanwhile, a dielectric layer represented by each of $AlO_x$, $SiO_x$, and $HfO_x$ was deposited with a thickness of about 15 nm on the surface of the above-prepared porous substrate by the ALD method under the same conditions as above. The dielectric layer on the porous substrate thus obtained was analyzed by the EDS analysis in the same manner as the evaluation on a flat plate to calculate an average value ($O_d/M_d$) of EDS signal intensity ratios of oxygen elements/metal elements.

The ratio Z ($=[O_d/M_d]/[O_r/M_r]$) was calculated from the above calculated $O_r/M_r$ of the reference material and $O_d/M_d$ of the dielectric layer on the porous substrate according to Expression (1) above. Results are shown in Tables 3 to 5 for each of the dielectric layers $AlO_x$, $SiO_x$ and $HfO_x$.

(Withstand Voltage Test)

The capacitor obtained above was measured for its dielectric breakdown voltage. Specifically, DC voltage was applied between Cu electrodes formed on the front and back of the capacitor while being gradually increased, and voltage when current flowing through the capacitor exceeded 1 mA was indicated as the dielectric breakdown voltage. Each of 50 samples was tested, and a median value of the samples was calculated. Tables 3 to 5 each show test results.

About the Dielectric Layer $AlO_x$

TABLE 3

| Sample number | Path integral value (μm/μm²) | Porosity (%) | $O_d/M_d$ (—) | Z (—) | Dielectric breakdown voltage (V) |
|---|---|---|---|---|---|
| Example 1 | 2.0 | 49 | 0.53 | 0.93 | 11.2 |
| Example 2 | 3.8 | 49 | 0.51 | 0.89 | 11.2 |
| Example 3 | 9.2 | 49 | 0.49 | 0.86 | 11.0 |
| Example 4 | 12.2 | 49 | 0.50 | 0.88 | 11.3 |
| Example 5 | 3.8 | 63 | 0.54 | 0.95 | 11.8 |
| Example 6 | 4.6 | 63 | 0.55 | 0.96 | 11.9 |
| Example 7 | 12.2 | 63 | 0.54 | 0.95 | 11.4 |
| Example 8 | 15.0 | 63 | 0.46 | 0.81 | 10.8 |
| Example 9 | 3.8 | 72 | 0.52 | 0.91 | 11.0 |
| Example 10 | 4.6 | 72 | 0.54 | 0.95 | 11.5 |
| Example 11 | 7.8 | 72 | 0.55 | 0.96 | 11.4 |
| Example 12 | 9.2 | 72 | 0.55 | 0.96 | 11.3 |
| Example 13 | 12.2 | 72 | 0.51 | 0.89 | 11.2 |
| Example 14 | 15.0 | 72 | 0.45 | 0.79 | 10.9 |
| Example 15 | 3.8 | 85 | 0.52 | 0.91 | 11.2 |
| Example 16 | 9.2 | 85 | 0.52 | 0.91 | 11.3 |
| Example 17 | 15.0 | 85 | 0.49 | 0.86 | 11.1 |
| Example 18 | 4.6 | 88 | 0.52 | 0.91 | 11.0 |
| Example 19 | 15.0 | 88 | 0.48 | 0.84 | 11.2 |
| Comparative Example 1 | 19.2 | 72 | 0.34 | 0.60 | 4.7 |
| Comparative Example 2 | 19.2 | 85 | 0.32 | 0.56 | 3.2 |
| Comparative Example 3 | 19.2 | 88 | 0.36 | 0.63 | 4.6 |

About the Dielectric Layer $SiO_x$

TABLE 4

| Sample number | Path integral value (μm/μm²) | Porosity (%) | $O_d/M_d$ (—) | Z (—) | Dielectric breakdown voltage (V) |
|---|---|---|---|---|---|
| Example 1 | 2.0 | 49 | 0.90 | 0.90 | 12.8 |
| Example 2 | 3.8 | 49 | 0.94 | 0.94 | 12.7 |
| Example 3 | 9.2 | 49 | 0.92 | 0.92 | 12.6 |
| Example 4 | 12.2 | 49 | 0.90 | 0.90 | 12.4 |
| Example 5 | 3.8 | 63 | 0.98 | 0.98 | 13.0 |
| Example 6 | 4.6 | 63 | 0.96 | 0.96 | 13.1 |
| Example 7 | 12.2 | 63 | 0.95 | 0.95 | 12.9 |
| Example 8 | 15.0 | 63 | 0.92 | 0.92 | 12.7 |
| Example 9 | 3.8 | 72 | 0.96 | 0.96 | 13.2 |
| Example 10 | 4.6 | 72 | 0.93 | 0.93 | 13.1 |
| Example 11 | 7.8 | 72 | 0.94 | 0.94 | 12.8 |
| Example 12 | 9.2 | 72 | 0.93 | 0.93 | 12.8 |
| Example 13 | 12.2 | 72 | 0.89 | 0.89 | 12.2 |
| Example 14 | 15.0 | 72 | 0.89 | 0.89 | 12.3 |
| Example 15 | 3.8 | 85 | 0.86 | 0.86 | 12.4 |
| Example 16 | 9.2 | 85 | 0.90 | 0.90 | 11.8 |
| Example 17 | 15.0 | 85 | 0.85 | 0.85 | 11.6 |
| Example 18 | 4.6 | 88 | 0.88 | 0.88 | 11.9 |
| Example 19 | 15.0 | 88 | 0.82 | 0.82 | 11.6 |
| Comparative Example 1 | 19.2 | 72 | 0.71 | 0.71 | 6.0 |
| Comparative Example 2 | 19.2 | 85 | 0.62 | 0.62 | 1.2 |
| Comparative Example 3 | 19.2 | 88 | 0.50 | 0.50 | 0.2 |

About the Dielectric Layer HfO$_x$

TABLE 5

| Sample number | Path integral value (μm/μm²) | Porosity (%) | O$_d$/M$_d$ (—) | Z (—) | Dielectric breakdown voltage (V) |
|---|---|---|---|---|---|
| Example 1 | 2.0 | 49 | 0.28 | 1.00 | 5.4 |
| Example 2 | 3.8 | 49 | 0.28 | 1.00 | 5.5 |
| Example 3 | 9.2 | 49 | 0.27 | 0.96 | 5.1 |
| Example 4 | 12.2 | 49 | 0.25 | 0.89 | 4.8 |
| Example 5 | 3.8 | 63 | 0.28 | 1.00 | 5.2 |
| Example 6 | 4.6 | 63 | 0.26 | 0.93 | 5.0 |
| Example 7 | 12.2 | 63 | 0.26 | 0.93 | 5.1 |
| Example 8 | 15.0 | 63 | 0.24 | 0.86 | 5.2 |
| Example 9 | 3.8 | 72 | 0.27 | 0.96 | 5.3 |
| Example 10 | 4.6 | 72 | 0.28 | 1.00 | 5.5 |
| Example 11 | 7.8 | 72 | 0.28 | 1.00 | 5.4 |
| Example 12 | 9.2 | 72 | 0.28 | 1.00 | 5.2 |
| Example 13 | 12.2 | 72 | 0.26 | 0.93 | 4.9 |
| Example 14 | 15.0 | 72 | 0.26 | 0.93 | 4.9 |
| Example 15 | 3.8 | 85 | 0.27 | 0.96 | 5.0 |
| Example 16 | 9.2 | 85 | 0.27 | 0.96 | 4.8 |
| Example 17 | 15.0 | 85 | 0.24 | 0.86 | 4.5 |
| Example 18 | 4.6 | 88 | 0.26 | 0.93 | 4.9 |
| Example 19 | 15.0 | 88 | 0.24 | 0.86 | 4.6 |
| Comparative Example 1 | 19.2 | 72 | 0.21 | 0.75 | 2.1 |
| Comparative Example 2 | 19.2 | 85 | 0.20 | 0.71 | 0.2 |
| Comparative Example 3 | 19.2 | 88 | 0.18 | 0.64 | 0.2 |

Figure 12:
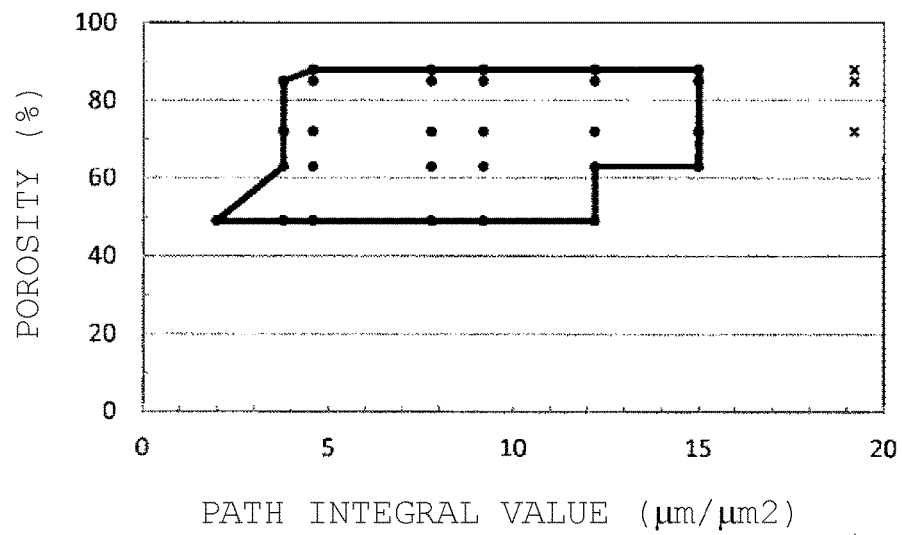
FIG. 12 is a graph showing a path integral value and a porosity of a conductive porous substrate used in each of the example of the present invention and the comparative example.

FIG. 12 illustrates a graph in which path integral values (μm/μm²) and porosities (%) of respective used conductive porous substrates, which are respectively indicated as x and y, are plotted on the plane formed by x and y axes orthogonal to each other. In the graph of FIG. 12, black circles indicate respective examples and crosses indicate respective comparative examples. In the graph of FIG. 12, a region surrounded by points A (2.0, 49), B (12.2, 49), C (12.2, 63), D (15.0, 63), E (15.0, 88), F (4.6, 88), G (3.8, 85) and H (3.8, 63), each of which is (x, y), is indicated by a solid line.

Figure 13:
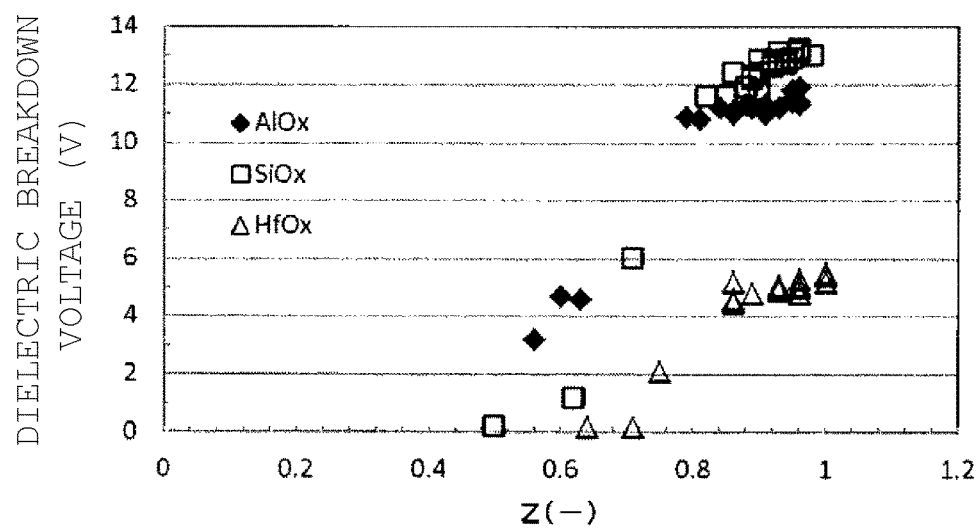
FIG. 13 is a graph showing a ratio Z of a dielectric layer of the capacitor and dielectric breakdown voltage in each of the example of the present invention and the comparative example.

In addition, FIG. 13 illustrates a graph in which ratio Z (–) is plotted on the horizontal axis and dielectric breakdown voltage (V) is plotted on the vertical axis, using data in Tables 3 to 5.

It was found that dielectric breakdown voltage of the dielectric layer was high when the porous portion had a path integral value of 1 μm/μm² or more and 16 μm/μm² or less, a porosity of 20% or more and 90% or less, and a ratio Z of 0.79 or more for the dielectric layer, and that when each of the characteristics was less than the value above, the dielectric breakdown voltage rapidly decreased to remarkably deteriorate performance of a capacitor.

The capacitor of the present invention has high performance (high dielectric breakdown voltage) while a function of a dielectric layer is sufficiently held, so that the capacitor can be suitably used for various electronic devices.

DESCRIPTION OF REFERENCE SYMBOLS

1: capacitor
2: conductive porous substrate
4: Dielectric layer
6: upper electrode
10: support portion
12: high porosity portion
14: low porosity portion
16: Insulating portion
18: first external electrode
20: second external electrode
22: conductive substrate
24: porous metal layer
26: support layer
28: groove
30: Dielectric layer
32: insulating layer
34: upper electrode layer
36: external electrode layer

The invention claimed is:

1. A capacitor comprising:
a conductive porous substrate having a porous portion;
an upper electrode; and
a dielectric layer between the upper electrode and the porous portion and containing an oxygen element and at least one metal element; and
wherein the porous portion has a path integral value of 1 μm/μm² to 16 μm/μm², and a porosity of 20% to 90%, and wherein a ratio Z expressed by (1) is 0.79 or more, $$Z = \frac{O_d/M_d}{O_r/M_r} \quad (1)$$

where O$_d$ and M$_d$ respectively represent signal intensities of the oxygen element and the at least one metal element when the dielectric layer is analyzed by energy dispersive X-ray spectroscopy, and
where O$_r$ and M$_r$ respectively represent signal intensities of the oxygen element and the metal element when a reference material having stoichiometric composition of the oxygen element and the at least one metal element constituting the dielectric layer is analyzed by the energy dispersive X-ray spectroscopy.

2. The capacitor according to claim 1, wherein, when the path integral value (μm/μm²) and the porosity of the porous portion are indicated as x and y, respectively, and are plotted on a plane formed by an x-axis and a y-axis orthogonal to each other, (x, y) is within a region surrounded by points A (2.0, 49), B (12.2, 49), C (12.2, 63), D (15.0, 63), E (15.0, 88), F (4.6, 88), G (3.8, 85), and H (3.8, 63).

3. The capacitor according to claim 1, wherein the porosity is 30% to 80%.

4. The capacitor according to claim 1, wherein the path integral value is 2 μm/μm² to 15 μm/μm².

5. The capacitor according to claim 1, wherein the path integral value is 4 μm/μm² to 12 μm/μm².

6. The capacitor according to claim 1, wherein the at least one metal element is selected from Al, Hf, Si, Zr, Ta, Ti, Sr, Pb, La, Ba and Nb.

7. The capacitor according to claim 2, wherein the at least one metal element is selected from Al, Hf, Si, Zr, Ta, Ti, Sr, Pb, La, Ba and Nb.

8. The capacitor according to claim 1, wherein the at least one metal element is selected from Al, Hf, Si and Zr.

9. The capacitor according to claim 8, wherein the reference material is at least one selected from Al$_2$O$_3$, HfO$_2$, SiO$_2$ and ZrO$_2$, or a mixture thereof.

10. The capacitor according to claim 2, wherein the at least one metal element is selected from Al, Hf, Si and Zr.

11. The capacitor according to claim 10, wherein the reference material is at least one selected from Al$_2$O$_3$, HfO$_2$, SiO$_2$ and ZrO$_2$, or a mixture thereof.

12. The capacitor according to claim 1, wherein the ratio Z is 0.79 to 1.2.

13. The capacitor according to claim 1, wherein the dielectric layer is an atomic layer deposited dielectric layer.

14. The capacitor according to claim 1, wherein the upper electrode layer is an atomic layer deposited upper electrode layer.

* * * * *